United States Patent [19]

Long

[11] 4,062,989

[45] Dec. 13, 1977

[54] METHOD AND APPARATUS FOR COATING MOVING WEBS AND PRODUCTS PRODUCED THEREBY

[75] Inventor: Delmar D. Long, Rock Hill, S.C.

[73] Assignee: M. Lowenstein & Sons, Inc., New York, N.Y.

[21] Appl. No.: 695,723

[22] Filed: June 14, 1976

[51] Int. Cl.² .................. B05D 3/12; B05D 1/00; B05D 5/00

[52] U.S. Cl. ................................ 427/176; 118/34; 118/68; 118/411; 118/412; 156/88; 156/139; 156/141; 156/185; 156/229; 427/209

[58] Field of Search ................ 118/34, 68, 411, 412; 427/176, 209; 156/88, 139, 141, 185, 229

[56] References Cited

U.S. PATENT DOCUMENTS

| 1,867,183 | 7/1932 | Simons | 427/209 X |
|---|---|---|---|
| 2,022,322 | 11/1935 | Pelton | 427/176 X |
| 2,349,710 | 5/1944 | Evans | 427/176 X |
| 2,389,459 | 11/1946 | Remark et al. | 427/176 X |
| 2,450,847 | 10/1948 | Wilson | 118/34 X |
| 2,758,048 | 8/1956 | Ceretti | 427/176 X |
| 2,837,440 | 6/1958 | Boivin | 427/176 X |
| 2,844,488 | 7/1958 | Meherg et al. | 427/176 X |
| 2,859,482 | 11/1958 | Warren et al. | 18/56 |
| 2,881,732 | 4/1959 | Chrystman | 118/33 |
| 3,068,836 | 12/1962 | Spencer | 118/34 |
| 3,149,003 | 9/1964 | Christie et al. | 118/34 |
| 3,322,553 | 5/1967 | Seifried et al. | 427/176 X |
| 3,508,522 | 4/1970 | Daguetta et al. | 118/50 |
| 3,556,832 | 1/1971 | Park | 427/176 X |
| 3,675,621 | 7/1972 | Griffin et al. | 118/122 |
| 3,704,151 | 11/1972 | Aronoff | 427/176 |
| 3,765,978 | 10/1973 | Matt | 156/148 |
| 3,784,427 | 1/1974 | Griffin | 156/139 |
| 3,832,210 | 8/1974 | Rohlfing | 427/176 |
| 3,870,478 | 3/1975 | Rohlfing | 29/2.1 |
| 3,899,999 | 8/1975 | Christ et al. | 118/405 |
| 3,908,590 | 9/1975 | Quint | 118/122 |
| 3,930,464 | 1/1976 | Wallsten | 118/122 |
| 3,941,902 | 3/1976 | Wennerblom et al. | 427/172 |

Primary Examiner—Michael R. Lusignan
Attorney, Agent, or Firm—Wellington M. Manning, Jr.; Luke J. Wilburn, Jr.

[57] ABSTRACT

Method and apparatus for the surface coating and impregnation of the interstices of a moving porous web, and particularly method and apparatus for the production of elastomer-coated, bias-cut woven fabrics during a tentering operation. The coating apparatus disclosed consists of means for applying a layer of coating material sequentially to the lower and upper surfaces of the moving web to substantially penetrate the coating into the interstices of the web, while smoothing the surfaces to provide a uniform and controlled coating of desired thickness on the fabric.

17 Claims, 3 Drawing Figures

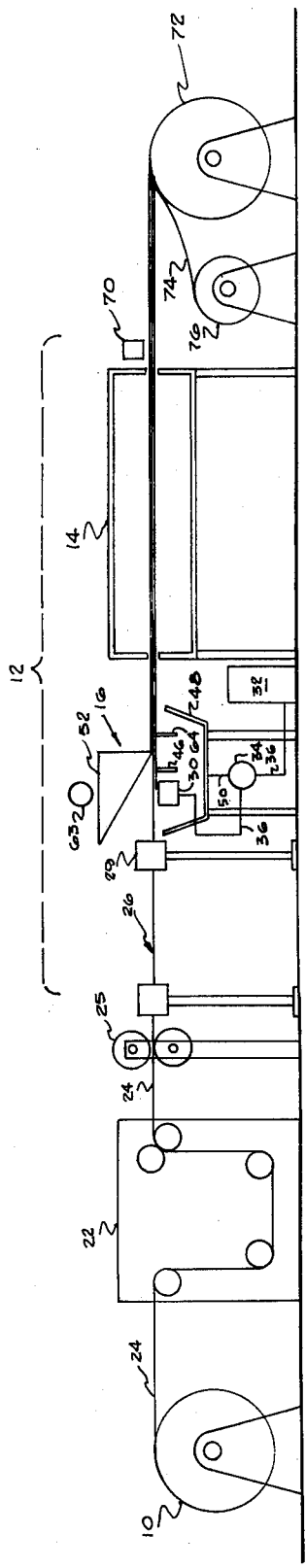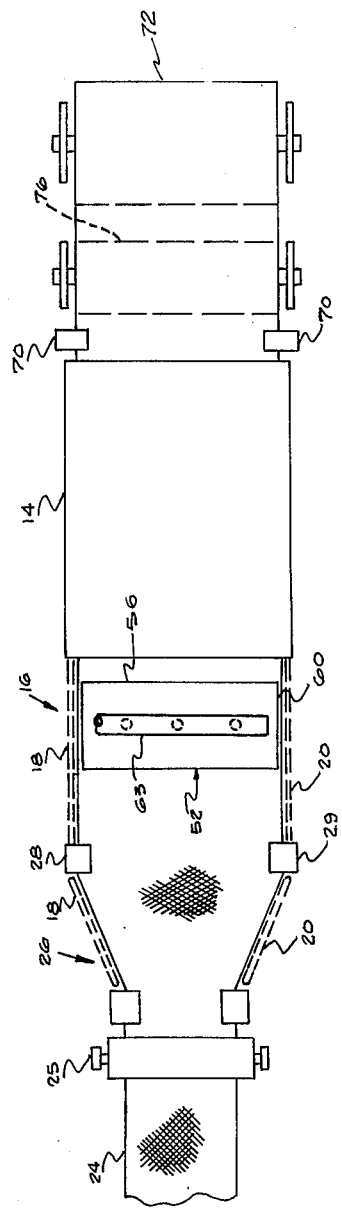

METHOD AND APPARATUS FOR COATING MOVING WEBS AND PRODUCTS PRODUCED THEREBY

The present invention is directed to method and apparatus for coating a moving web of material, and, more particularly to method and apparatus for manufacturing elastomer-coated woven fabrics employed in the production of industrial products such as power transmission belts, hoses, conveyor belts, and the like. The invention is also directed to the coated products produced by such method and apparatus.

It is a known practice in the production of industrial products, such as power transmission belts and hoses, to incorporate as a protective cover and/or reinforcement in the construction, a bias-cut woven textile fabric, i.e., a woven fabric having its warp and weft threads disposed at an angle to its longitudinal axis, which has been previously coated and impregnated with an uncured, tacky elastomeric compound, such as a synthetic rubber. Typically in the manufacture of power transmission V-belts, a wide width bias-cut, elastomer-coated fabric is longitudinally cut into narrow strips and the individual strips laid longitudinally along the longitudinal axis of the uncured elastomeric core of the belt, wrapped about the core with the fabric edges in overlapping relation, and bonded thereto in a curing operation to provide a protective cover which provides improved wear life for the V-belt construction. By arranging the warp and weft threads of the fabric strip at an angle to the longitudinal axis of the belt, the belt remains free to stretch and flex during use without undue restriction by the threads of the reinforcing fabric.

U.S. Pat. No. 3,784,427 discloses one method of manufacturing bias-cut, elastomer-coated woven fabrics wherein a tubular woven fabric is cut spirally on a 45° angle to produce a continuous sheet of fabric having the warp and weft threads disposed at a 45° angle to the longitudinal axis of the sheet. To further increase the ability of the fabric to elongate in longitudinal direction during extension and flexing of the V-belt, the bias-cut fabric sheet is stretched in widthwise direction, as by overfeeding onto a pin tenter frame, to increase the angular relationship of the warp and weft threads with respect to the longitudinal axis of the fabric. As disclosed in said patent, a binder composition is applied to the fabric sheet before tentering and stretching and the binder is cured thereon during or after tentering to stabilize the sheet in the adjusted thread angle. Thereafter, the stabilized fabric is impregnated by immersion in a bath containing an elastomeric composition, e.g., neoprene dissolved in a solvent, dried to a tackified state, and cut into narrow strips for application to the V-belt cores.

To obtain an intimate bond of the fabric to the belt core during cure and to insure firm securement of the fabric in the V-belt construction during use of the belt, it is highly desirable that the interstices of the fabric be thoroughly impregnated and the surfaces of the fabric be uniformly coated with the tacky elastomeric composition. Since immersion impregnation and coating of the fabric with the elastomer prior to tentering is impractical because of the resultant fouling of the tenter frame pins by the sticky, viscous elastomer coating during the stretching operation, a nontacky binder composition has been employed to maintain the fabric in stabilized condition until it is immersion-impregnated, after tentering, with the elastomer composition.

It is an object of the present invention to provide method and apparatus for the uniform and controlled coating and impregnation of the interstices of a running web of porous material.

It is another object of the present invention to provide improved method and apparatus for producing elastomer-coated, bias-cut woven fabrics employed in the production of industrial products.

It is a further object of the present invention to provide apparatus for uniformly coating the surfaces of a moving web of porous material while substantially penetrating the interstices of the web with the coating material to provide a more intimate bonding of the coating material thereto.

It is a more specific object of the present invention to provide an improved method and apparatus for uniformly coating and impregnating a bias-cut woven fabric with a tacky elastomeric resin during the tentering of the fabric on a tenter frame and without the need for application of an additional binder to stabilize the fabric until application of the elastomeric coating.

It is another object of the present invention to provide an improved elastomer-coated, bias-cut woven fabric for use in industrial products.

The invention will be better understood, and the above as well as other objects of the invention will become more apparent, from the following detailed description of a preferred embodiment of the invention when taken in conjunction with the accompanying drawings, in which:

FIG. 1 shows diagramatically, in side elevation, apparatus for producing elastomer-coated, bias-cut woven fabrics used in industrial products, such as V-belts and the like;

FIG. 2 is a plan view of the coating and tenter frame portions of the apparatus shown in FIG. 1.

Figure 3:
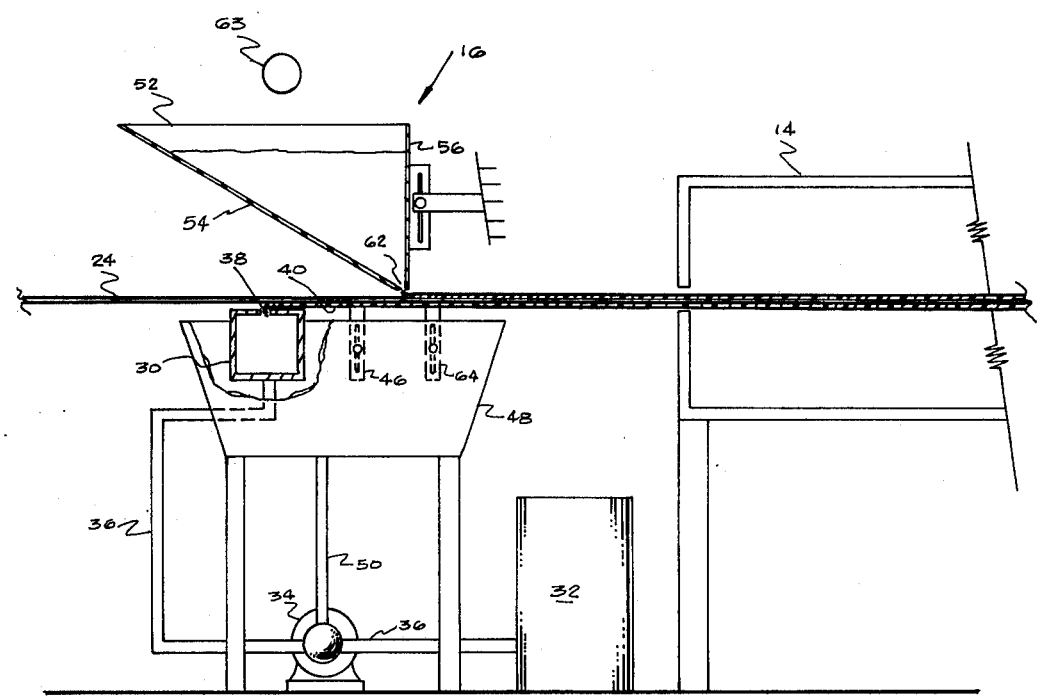
FIG. 3 is an enlarged, schematic side elevation view of the coating apparatus as shown in FIG. 1.

Portions of the apparatus are shown in section, and broken away, for convenience.

Referring more particularly to FIG. 1 of the drawings, an indefinite length sheet of bias-cut woven fabric is continuously supplied for treatment from a supply source, such as a roll 10. The bias-cut fabric may be provided, in known conventional manner, by spirally cutting a tubular woven fabric at an angle of approximately 45° to provide a continuous sheet of fabric having warp and weft threads disposed at right angles to each other and at 45° angles to the longitudinal axis of the sheet.

The apparatus as seen in FIG. 1 generally includes a pin tenter frame 12 having a heating oven 14, and a coating device 16 of the present invention positioned above and below the path of travel of the fabric on the tenter frame just before the entrance to the heating oven 14. The tenter frame 12 is of conventional type well known in the art having spaced, moving chains, indicated schematically by dashed lines 18, 20 (FIG. 2), which are provided with pins for supportably engaging the edges of the fabric to transport the fabric through the tenter frame. Sections of chains in the tenter are angularly adjustable to stretch the fabric in widthwise direction during its movement through the tenter.

If desired, the bias-cut fabric from supply roll 10 may be passed through a water bath 22 to remove excess sizing from the fabric and lubricate the threads to facilitate their angular adjustment during tentering. The fabric sheet 24 is overfed, in conventional manner, as by driven rolls 25, onto the first section 26 of the tenter frame where the edges of the fabric are supportably engaged by the pins of the traveling chains of the tenter. The chains in the first section 26 are angularly adjusted about pivot points 28, 29 (FIG. 2) to stretch the fabric in widthwise direction during its longitudinal movement and thereby increase the angular relationship of the warp and weft threads of the fabric by the desired amount. Typically, in the production of woven fabrics for V-belt constructions, the fabrics may be stretched in the first section of the tenter frame to increase the angle between the warp and weft threads from about 20° to approximately 120°, as illustrated by the threads in FIG. 2. The rate of the overfeed of the fabric and the angular disposition of the tenter chains are coordinated, in known manner, to impart the desired angular thread relationship to the fabric during stretching. After stretching, the fabric sheet 24 is transported in stretched condition on the tenter frame in a generally horizontal path through the coating apparatus 16.

As best seen in FIGS. 1 and 3, the coating apparatus 16 of the present invention comprises a first coating material applicator or manifold 30 which is supportably positioned beneath and extends across the path of travel of the fabric. Manifold 30 is supplied with coating material from a coating supply tank 32 buy means of a pump 34 and conduits 36. The upper face of the manifold is provided with an elongate discharge slot 38 (FIG 3) for extruding a layer 40 of viscous, elastomeric coating material, under pressure, against the bottom surface of the moving fabric. The coating material is extruded through the slot 38 at a rate to force, or pump, a portion of the viscous material upwardly into the interstices of the fabric between the threads. The length of manifold slot 38 is less than the width of the fabric being coated to insure that the selvage edges of the fabric sheet are not contacted with coating material and thereby keep the viscous coating material from contacting and contaminating the pins of the tenter chains.

Supportably positioned beneath and extending across the path of travel of the fabric immediately downpath of manifold slot 38 is a vertical scraper bar or plate 46 which is verically adjustable relative to the horizontal path of the fabric to engage and smooth the layer of coating material applied to the undersurface of the fabric, and to remove an excess material from the layer to obtain a desired coating thickness.

Positioned beneath the manifold 30 and scraper plate 46 is a collection trough 48 which receives any excess coating material falling from the manifold and scraper plate for recirculation back to the manifold by way of a conduit 50 and pump 34.

Supportably positioned above and extending across the path of the fabric on the downpath side of lower scraper plate 46 is a second coating material applicator, shown as an elongate hopper 52, for discharging coating material onto the top surface of the moving sheet 24. Hopper 52 is composed of a pair of opposed transverse walls 54, 56 which are connected by side walls 58, 60 (FIG. 2) to define an open top trough or compartment having a lower elongate slot 62 (FIG. 3) extending across the path of travel of the fabric sheet between the tenter chains for continuously gravitationally discharging a layer 61 of coating material onto the top surface of the sheet. The hopper is continuously supplied to a desired level with coating material by a material supply pipe 63. Hopper 52 is vertically adjustable and the lower edge of vertical wall 56 serves to smooth and control the thickness of the coating material applied to the upper surface of sheet 24. Depending on the particular viscosity of the coating material, the hopper may be vertically positioned and the level of the coating material in the hopper controlled to insure that the coating material in forced into and substantially penetrates the interstices of the fabric sheet to contact the lower surface coating material previously forced into the interstices by the pressure manifold 30. By providing contact of the upper and lower surface coatings through the interstices of the fabric, a more intimate bonding of the coatings to the fabric, and the coated fabric to the V-belt core, can be obtained. A portion of the coating material from the upper and lower applicators 30, 52 may also be forced into the thread or fiber bundles of the yarns of the fabric by the coating apparatus to further improve the adhesion of the coating to the fabric.

As in the case of the extrusion manifold slot, hopper slot 62 does not extend the full width of the fabric sheet, but terminates inside the selvage edges of the fabric a sufficient distance to insure that the coating is not applied to the edges to contaminate the pins of the tenter frame.

Positioned below and extending across the path of travel of the fabric on the downpath side of the upper coating hopper 52 is a second vertically adjustable scraper bar or plate 64. If desired, the bar may be vertically positioned to further smooth the lower coating, as well as remove any additional thickness of coating which maybe produced in the lower coating as a result of the application of the upper coating to the fabric.

Upon leaving the coating device 16, the coated fabric is transported in tensioned condition on the tenter chains through the heating oven 14 where the coating is dried to produce a tacky elastomeric covering on the fabric. As the fabric emerges from the heating oven, the uncoated selvage edges are cut from the fabric by suitable cutting means, such as rotating knives, indicated diagramatically at 70, and the fabric is collected on a collection roll 72. To prevent adhesion of the layers of the coated fabric on the collection roll 72 and facilitate removal of the fabric from the roll, a sheet of plastic film 74, such as polyethylene, is supplied from a roll 76 during winding to separate the fabric layers.

From the foregoing description of a preferred embodiment of the invention, it can be seen that the apparatus of the present invention may be employed to accurately apply a viscous elastomeric coating to bias-cut, woven fabrics as a part of and during the tentering operation, thereby eliminating the necessity of a binder or pre-coat to stabilize the fabric before application of the principal elastomeric coating.

Various porous webs and textile fabrics, e.g., woven, knit, non-woven, may be effectively coated and impregnated by use of the apparatus of the present invention. The fabrics may vary widely in construction, weight, and fiber type, depending upon the end use requirements of the fabrics. Similarly, the viscosity and composition of the coating materials may be varied, depending upon fabric construction and end use. In the production of elastomer-coated woven fabrics for V-belt constructions, fabrics composed of cotton, polyester, and polyester/cotton blend yarns are currently commercially desirable. The elastomeric coating materials for such fabrics typically may consist of neoprene compositions and particularly desirable are aqueous neoprene latex compositions.

Use of the apparatus and coating method of the present invention in the production of elastomer-coated, bias-cut woven fabrics is illustrated by the following specific example.

EXAMPLE

An 8 ounce per square yard tubular woven fabric composed of 100 percent cotton yarns having a cotton count of 16/1 and a 35 by 35 pick construction is spirally cut on a 45° angle to produce a 45 inch wide continuous sheet of woven fabric in which the warp and fill yarns are disposed at 90° angles to each other and at 45° angular relation to the longitudinal axis of the sheet.

The fabric is continuously overfed, at about 45 percent, onto the tenter chain pins of the tenter frame and stretched in the first zone of the frame to a width of approximately 60 inches to produce a thread angle between warp and weft threads of approximately 120°.

The stretched fabric is passed on the tenter chains in a generally horizontal path through the coating apparatus of FIGS. 1 and 3 where a flowable aqueous neoprene latex dispersion containing a suitable tackifying agent and having a viscosity of approximately 10,000 cps (Brookfield) is applied to the upper and lower surfaces of the fabric to obtain a 6 ounce per square yard dry weight pick up on the fabric.

The extrusion manifold, hopper, and scraper bars of the coating apparatus are adjusted to obtain a uniform coating on both sides of the fabric and a penetration of the coating material into the interstices of the fabric to insure contact of the upper and lower coating layers.

The coated fabric is passed by the pins of the tenter chains into a gas-fired heating oven where it is dried to a tacky, nonflowable state. Upon leaving the oven, the uncoated selvage edges of the fabric are cut from the fabric and the fabric collected, with a separator sheet of polyethylene, in roll form for subsequent use.

Although the invention has been described in reference to the production of elastomer-coated, bias-cut woven fabrics, the coating apparatus may be readily employed to coat any porous webs of material where it is desired to obtain a uniform coating on the surfaces of the web and full penetration of the coating material into the interstices of the web.

That which is claimed is:

1. Apparatus for coating the surfaces of a moving web of porous material to substantially penetrate the interstices of the web with the coating material comprising:
    a. means for moving the web in a generally horizontal path of travel;
    b. first applicator means positioned beneath and extending across the path for continuously extruding a layer of viscous coating material onto the bottom surface of the moving web and substantially upwardly into the interstices thereof;
    c. first scraper means positioned beneath and extending across the path closely adjacent the downpath side of said first applicator means for contacting the layer of coating material on the bottom surface to smooth the layer to a desired thickness and remove any excess coating material therefrom; and
    d. second applicator means positioned above and extending across the path closely adjacent the downpath side of said first scraper means for continuously discharging a layer of viscous coating material onto the top surface of the moving web and substantially downwardly into the interstices of the web to contact the bottom layer of coating material thereon, said second applicator means including edge means extending across the path for contacting the top surface layer of coating material to smooth and control the thickness of surface layer applied to the web.

2. Apparatus as defined in claim 1 including second scraper means positioned beneath and extending across the path adjacent the downpath side of said second applicator means for contacting the bottom surface layer of coating material on the web to smooth the layer to a desired thickness and remove any excess coating material therefrom.

3. Apparatus as defined in claim 1 including means positioned below said first applicator means and scraper means for collecting excess coating material falling therefrom and for recirculating said material to said first applicator means.

4. Apparatus as defined in claim 1 wherein said second applicator means comprises an elongate hopper extending across said path of travel and having opposed transverse walls and end walls defining a compartment having an elongate slot in its lower portion for continuously gravitationally discharging a layer of coating material onto the top surface of the moving web from said compartment, the downpath wall of said opposed transverse walls comprising a vertical plate having a lower edge defining said edge means and the downpath side of said elongate slot.

5. Apparatus as defined in claim 1 wherein said first applicator means includes a manifold having an outwardly disposed elongate slot positioned immediately beneath and extending across said path, and pump means operatively communicating with said manifold for supplying coating material thereto and for extruding a layer of coating material from said upwardly disposed slot onto the bottom surface of the moving web.

6. Apparatus as defined in claim 1 wherein said means for moving the web in a generally horizontal path of travel comprises conveying means positioned on each side of said path for supportably engaging edge portions of the web to maintain the edge portions of the web outside the area of application of coating material to the top and bottom surface of the web by said applicator means.

7. Apparatus as defined in claim 6 wherein said conveying means includes means for tensioning the web in widthwise direction during its passage in said horizontal path.

8. A method of producing elastomer-coated, bias-cut, woven fabrics suitable for use in industrial products comprising the steps of continuously moving an indefinite length of bias-cut woven fabric in a longitudinal direction while:
    a. imparting a force to the fabric to stretch the fabric in transverse direction and increase the angular relation of the threads of the fabric relative to the longitudinal axis of the fabric;
    b. maintaining said force on the fabric while passing the fabric in a generally horizontal path;
    d. applying a viscous flowable elastomeric composition to the upper and lower surfaces of the fabric in said path to substantially penetrate the interstices of the fabric with said material and provide a coating of substantially uniform thickness on the upper and lower surfaces of the fabric; and d. drying the thus coated fabric to harden the elastomeric composition and stabilize the fabric in stretched condition.

9. A method of producing elastomer-coated, bias-cut fabric comprising the steps of continuously transporting a length of a bias-cut woven fabric on a tenter frame while:
   a. stretching the fabric in widthwise direction to increase the angular relation of the warp and weft threads of the fabric relative to the longitudinal axis of the fabric;
   b. applying a flowable elastomeric composition to the opposite faces of the stretched fabric inwardly of its longitudinal edges to substantially penetrate the interstices of the fabric with the composition and impart a substantially uniform surface coating of the composition on the opposite faces of the fabric while maintaining longitudinal edge portions of the fabric free from contact with said elastomeric composition; and
   c. drying the coated fabric to harden the coating thereon and stabilize the fabric in its stretched condition.

10. A method as defined in claim 9 including the further steps of removing the uncoated longitudinal edges of the fabric, and collecting the coated fabric for subsequent use.

11. A method as defined in claim 10 wherein the coated fabric is collected by winding the fabric onto a collection roll with a separator sheet of material disposed between the adjacent layers of the coated fabric on the roll to prevent adhesion of the layers of the fabric to each other.

12. A method as defined in claim 9 wherein the elastomeric composition is applied to the fabric by moving the fabric in a substantially horizontal path of travel while:
   a. extruding a layer of the composition upwardly onto the undersurface of the fabric to substantially penetrate the interstices of the fabric with the composition;
   b. contacting the layer to smooth and remove excess composition from the layer to obtain a coating of desired thickness on the undersurface of the fabric; and
   c. gravitationally discharging a layer of the composition onto the upper surface of the fabric to substantially penetrate the interstices of the fabric with the composition, while smoothing the layer to provide a coating of desired thickness on the upper surface of the fabric.

13. A method as defined in claim 12 including the further step of contacting the undersurface of the horizontally moving fabric after application of the upper surface coating thereon to remove excess composition from the undersurface coating.

14. A method for uniformly coating and impregnating the interstices of an indefinite length of moving porous web with a viscous coating composition comprising the steps of longitudinally moving the web in a substantially horizontal path while:
   a. extruding a layer of viscous coating material onto the lower surface of the web to substantially penetrate the interstices thereof with the coating material;
   b. contacting the layer with a fixed rigid member to smooth the surface of the layer and obtain a desired thickness of the layer on the undersurface of the web; and
   c. gravitationally discharging a layer of viscous coating material onto the upper surface of the web to substantially penetrate the interstices thereof with coating material while smoothing the layer to a desired thickness on the upper surface.

15. The product produced by the method of claim 14.
16. The product produced by the method of claim 8.
17. The product produced by the method of claim 9.

* * * * *

UNITED STATES PATENT OFFICE
CERTIFICATE OF CORRECTION

Patent No. 4,062,989      Dated December 13, 1977

Inventor(s) Delmar D. Long

It is certified that error appears in the above-identified patent and that said Letters Patent are hereby corrected as shown below:

Column 6, line 63, "d." should read -- c. --.

Column 8, line 1, "6of" should read -- of --.

Signed and Sealed this

Seventh Day of March 1978

[SEAL]

Attest:

RUTH C. MASON
Attesting Officer

LUTRELLE F. PARKER
Acting Commissioner of Patents and Trademarks